United States Patent
König et al.

(10) Patent No.: US 6,868,085 B1
(45) Date of Patent: Mar. 15, 2005

(54) METHOD FOR PARALLEL SEARCHING A LOOK-UP TABLE

(75) Inventors: Uwe König, Hildesheim (DE); Hans-Christian Schaub, Braunschweig (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 780 days.

(21) Appl. No.: 09/698,728

(22) Filed: Oct. 27, 2000

(51) Int. Cl.[7] .............................................. H04L 12/28
(52) U.S. Cl. .................................. 370/395.31; 370/397
(58) Field of Search .................. 370/409, 351–356, 370/389, 396, 395.3, 397, 399, 395.31, 395.32, 398, 400, 401, 392, 395.1, 395.4; 707/3, 4

(56) References Cited

U.S. PATENT DOCUMENTS

| | | | |
|---|---|---|---|
| 4,897,785 A | * 1/1990 | Zuger | 711/216 |
| 5,815,737 A | * 9/1998 | Buckland | 370/395.32 |
| 6,044,077 A | 3/2000 | Luijten et al. | 370/392 |
| 6,216,125 B1 | * 4/2001 | Johnson | 707/4 |
| 6,246,686 B1 | * 6/2001 | Ha-Duong et al. | 370/395.3 |
| 6,556,570 B1 | * 4/2003 | Delattre et al. | 370/395.31 |

FOREIGN PATENT DOCUMENTS

| | | |
|---|---|---|
| EP | 0 760 589 A2 | 3/1997 |
| EP | 0 910 224 A1 | 4/1999 |
| EP | RS 106043 | 7/2001 |

OTHER PUBLICATIONS

*The Concept of Virtual Paths and Virtual Channels in ATM–Networks* by Herbert Schneider, Proceedings of the International Zurich Seminar on Digital Communications, CH, Zurich, Inst. for Quantum Electronics; Mar. 5, 1990; pp. 63–72; XP000315092.

Dhondt, E; Form ISA/ 210 International Search Report for PCT/EP01/12302 as completed on Jul. 3, 2002 (3 pages).

* cited by examiner

*Primary Examiner*—Ajit Patel
*Assistant Examiner*—Steven Blount

(57) ABSTRACT

A method and system are disclosed for parallel searching a table by first breaking the larger table into a plurality of smaller subtables. Once the larger table has been subdivided into subtables, all the subtables are searched simultaneously (in parallel). When a match is detected, a predetermined operation is performed.

6 Claims, 2 Drawing Sheets

METHOD FOR PARALLEL SEARCHING A LOOK-UP TABLE

BACKGROUND OF THE INVENTION

1. Technical Field of the Invention

The present invention relates in general to methods for looking up values stored in a table and, in particular, to a method for searching values stored in a table by breaking the table into subtables.

2. Description of Related Art

The present invention is a method for looking up values in a table. However, because it is difficult to discuss the method of the present invention without a framework, the following description of related art focuses on ATM networks and VPI/VCI look-up tables. It should be noted that the present invention may be applied to looking up other values in an ATM or other networks such as, for example, IP or peer-to-peer networks.

An ATM network is composed of nodes, interfaces, links, and virtual resources, just like other network schemes. There are two types of ATM nodes: network nodes and customer premise nodes. Network nodes are located inside an ATM network, while customer premise nodes are located at the peripheries of an ATM network. Network nodes connect to each other or to customer premise nodes. Customer premise nodes connect to network nodes, to user interfaces, or to other types of networks.

Nodes perform the switching and/or data transport functions within an ATM network. A data interface, or "switch," is located within each network or customer premise node. On network nodes, this interface is called the network node interface (NNI) and on customer premise nodes this interface is called the user network interface (UNI. UNIs are responsible for transferring data, while NNIs are responsible for both transferring data and providing signaling procedures to operate and control the ATM network.

The NNI and UNI are connected to each other by physical links such as coaxial cables. The physical links are then electronically subdivided into virtual paths and virtual channels. Each physical link can carry multiple virtual paths, and each virtual path can carry multiple virtual channels. In fact, up to 256 virtual paths can be defined for each physical link, and up to 65, 536 virtual channels can be defined within each virtual path.

Each virtual path and each virtual channel can be identified by a specific number. For the virtual path, this number is called the virtual path identifier (VPI); for the virtual channel, this number is called the virtual channel identifier (VCI). When combined, the VPI/VCI numeric identifier points to one and only one virtual channel in one and only one virtual path connected to a particular node. Though unique for a particular node, the VPI/VCI identifier may be used a second (or third, or fourth, etc.) time for other non-interconnected nodes within the same ATM network.

The virtual channels in virtual paths on physical links are used to carry segments of C) user data called cells. Each cell contains a header section and a payload section. The entire cell can carry 53 bytes of information, with the header section carrying 5 bytes of information and the payload section carrying 48 bytes of information. Large blocks of user data are broken down to fit into the data-carrying area of the cell, but the payload section is 48 bytes long, even if the information carried within the payload section takes less than 48 bytes of space.

The header section carries all the instructions a cell needs to travel from its origination location to its destination location. The instructions include, for example, data flow and data transfer information. The instructions also identify which virtual path and which virtual channel the cell must use when traveling from one node to another-i.e., the header stores VPI/VCI information.

An ATM cell travels between nodes of an ATM network using a technique called label swapping. Because of timing, traffic, or congestion, when a cell changes physical links at nodes, the cell may also have to change virtual channels and/or virtual paths. If there is a change in the virtual channel and/or virtual path, the cell's VPI and/or VCI must also be changed so that the cell's VPI and VCI identify the correct virtual path and/or virtual channel carrying the cell.

To change the VPI/VCI stored in a cell, three sets of VPI/VCIs must be used: the actual incoming VPI/VCI stored in the cell, a tabulated incoming VPI/VCI stored in the node's memory, and an outgoing VPI/VCI stored in the node's memory and associated with the tabulated incoming VPI/VCI. When a switch is first initialized, a table is generated containing all the possible incoming VPI/VCIs and all the possible outgoing VPI/VCIs. Further, each tabulated incoming VPI/VCI is matched with an outgoing VPI/VCI. This table is stored in the node's memory. When a cell containing an actual incoming VPI/VCI arrives at the node, the actual incoming VPI/VCI is matched with a tabulated incoming VPI/VCI and a set of actions are performed related to the actual incoming VPI/VCI. The actions include, but are not limited to, swapping the actual incoming VPI/VCI with the outgoing VPI/VCI associated with the tabulated incoming VPI/VCI.

There are three general methods of looking up the actual incoming VPI/VCI, matching, and then performing a set of actions related to the actual incoming VPI/VCI. The first method uses the incoming VPI/VCI itself to address the table. Here, the VPI/VCI is entered into a function that maps the 28 bit value to a smaller value, with the value being smaller than 28. The table then has $2^n$ entries. Alternatively, the 28 bit value can be split into two or more values which are then used to address different tables.

The second prior art way of looking up the actual incoming VPI/VCI, matching, and then performing an action related to the incoming VPI/VCI (such as replacing it with an outgoing VPI/VCI is to simply search the entire VPI/VCI table. Here, the actual incoming VPI/VCI is compared with various tabulated incoming VPI/VCI values in the table. When the incoming VPI/VCI matches a tabulated incoming VPI/VCI in the table, an algorithm is used to perform an action including, but not limited to, swapping the incoming VPI/VCI with an outgoing VPI/VCI, erasing the incoming VPI/VCI, or counting the incoming or outgoing VPI/VCI.

A significant problem with the above-described methods is that they work well when web traffic is slow. However, the methods limit the number of cells passing through a switch if traffic increases. This is so because a switch has only a limited time—the time it takes for the switch to process the cell—to look up an outgoing VCI/VPI and perform the action needed to be performed. As the number of cells passing through the switch increases, the number of tabulated and outgoing VPI/VCI also increases, thereby making the table larger and larger. The increased number of cells also increases the number of look-ups per time period for both the existing table look-up methods described above. The larger table and the greater number of look-ups all decrease the available time for matching the incoming VPI/VCI with the outgoing VPI/VCI. Thus, the time it takes to look up a corresponding VPI/VCI can bottleneck at the node.

A third way for searching a numeric table solves the bottleneck problem but, at the same time, creates problems for other computing power related issues. The third way for searching table entries compares all the values in the table with the search term simultaneously. Since all the values in the table must be compared at the same time, this third method requires a great deal of hardware/processing power. The hardware/processing power requirement then increases the cost of the ATM switch. Thus, a new method is needed to read a value in a table without increasing the hardware/ processing power of the switch and will not be restricted by the amount of traffic at the switch.

SUMMARY OF THE INVENTION

A technical advantage of the present method is that the method reduces the time needed to look up values in a table or the amount of simultaneous took-ups.

Another technical advantage of the present method is that the method can increase the number of cells passing through a switch for a given time period and/or speeds up data transfer.

Another technical advantage of the present method is that the method allows for faster searching of a table without having to increase the hardware/processing power.

The present invention is a method for parallel searching for data stored in a table. The present invention searches the entire table by first breaking the larger table into a plurality of smaller subtables. The time period needed by the switch to process a cell determines the number of subtables needed. Thus, the number of subtables can change as the traffic flow per switch changes.

Once the original table has been subdivided into subtables, all the subtables are searched simultaneously.

BRIEF DESCRIPTION OF THE DRAWINGS

A more complete understanding of the method and apparatus of the present invention may be had by reference to the following detailed description when taken in conjunction with the accompanying drawings herein.

DETAILED DESCRIPTION OF THE DRAWINGS

The following is a detailed description of the present invention, a method to look up values in a table by first breaking the table into subtables. Though the present invention may be applied to any operation where looking up values in a table is required, for illustrative purposes, the description below focuses on-looking up VPIs and VCIs in an ATM network. It should be understood that the present invention may be used to look up other values in ATM or any other type of network including, but not limited to, IP or peer-to-peer networks.

Figure 1:
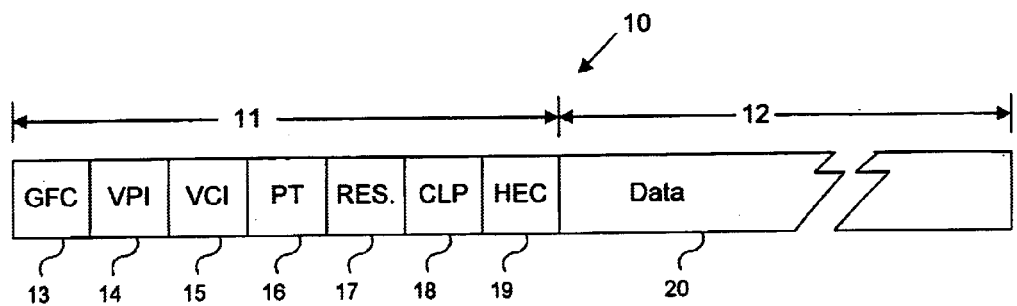
FIG. 1 is a graphical representation of an ATM data cell.

FIG. 1 is a pictorial representation of an ATM cell 10, used to transfer data in an ATM network. Cell 10 can be further subdivided into a header subsection 11 and a payload subsection 12. Cell 10 can store 53 bytes of information, with header 11 storing five bytes and payload 12 storing 48 bytes.

Header 11 contains locations for storing seven different pieces of information. The generic flow control (GFC) location 13 is found at the beginning of header 11. The GFC location can store four bits of information. The GFC is optional, and if not used, the 4 bits may be used by the VPI. The VPI location 14 is found next to the GFC location 13 and can store eight bits of information; the VCI 15 location is found next to the VPI location 14, and can store sixteen bits of information. The payload type (PT) location 16 can store two bits of information and is found next to the VCI location 15. One bit of reserved space 17 is found next to the PT location 16. The cell loss priority (CLP) location 18 also stores one bit of information and is found next to the reserved space 17 location. The header error check (HEC) location 19 is found next to the CLP location 18. HEC 19 can store eight bits of information and is the final element in header 11.

Payload 12 is found behind header 11. The data 20 transmitted by cell 10 is stored in the 48 bytes in payload 12.

Figure 2:
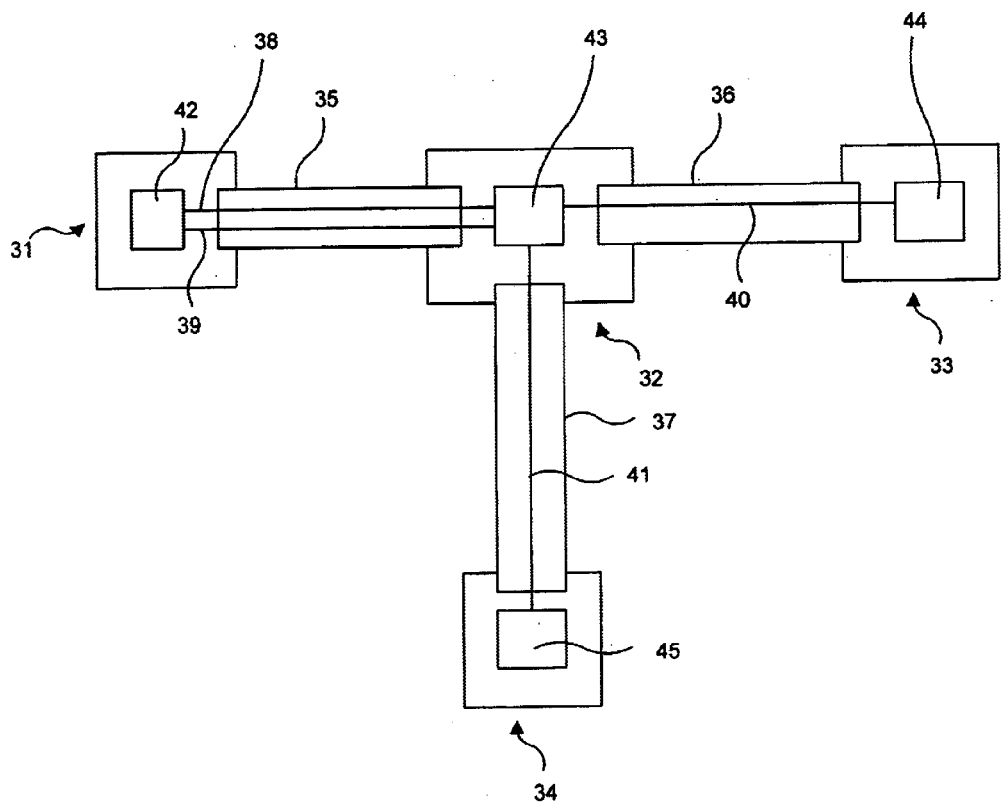
FIG. 2 is a portion of an ATM network.

FIG. 2 shows a plurality of nodes within a partial ATM network 30. It should be understood that the configuration and connections between the nodes in FIG. 2 are used here as an example only. The nodes within actual ATM networks may be simpler or more complex than that shown in FIG. 2.

Partial ATM network 30 is composed of nodes 31, 32, 33, and 34. A virtual path 35 connects node 31 to node 32. A virtual path 36 connects node 32 to node 33. A virtual path 37 connects node 32 to node 34. While FIG. 2 depicts only one virtual path connecting the various nodes to each other, it should be understood that a plurality of virtual paths may exist between any two nodes of an ATM network.

A plurality of virtual channels can exist within each virtual path. However, for illustrative purposes, FIG. 2 only shows a limited number of virtual channels within each virtual path. In FIG. 2, virtual channels 38 and 39 are located within virtual path 35, virtual channel 40 is located within virtual path 36, and virtual channel 41 is located within virtual path 37.

A switch is located at each ATM node. FIG. 2 shows switch 42 located at node 31, switch 43 located at node 32, switch 44 located at node 33, and switch 45 located at node 34. Switches 42, 43, 44, and 45 ensure cell 10 is transmitted from its origination node (not shown) to its destination node (not shown) by being properly routed from one virtual path and/or virtual channel to another virtual path and/or virtual channel between the nodes.

When a connection for transmitting data is established between an origination node (not shown) and a destination node (not shown), each node in the pathway the data is to travel is identified, along with each virtual channel and each virtual path. Since the data may travel on different virtual paths and different virtual channels between nodes, each node contains a table 46 (FIG. 3) in its memory that matches the VPI and VCI of the incoming cell 10 with an outgoing VPI and VCI and/or other related data. The table 46 is set up when the switch is first initialized.

It should be noted that table 46 may have separate sections within the larger table for VPI and VCI or may be one table storing a combined VPI/VCI pair. For illustrative purposes only, the following description of both the prior art method and the present invention assumes the numbers are stored in the table as a combined VPI/VCI pair. It should be understood, however, that the present invention may also be used when the VPI and the VCI are looked up separately.

When cell 10 travels from node 31 to node 33, cell 10 is first assigned a VPI and a VCI. As an example, cell 10 has a VPI of number "35" and a VCI of number "38," each corresponding with the virtual path and virtual channel cell 10 is to travel. The VPI identifier "35" is stored in VPI memory location 14, and the VCI identifier "38" is stored in VCI memory location 15. Cell 10 is then sent from node 31 to node 32 on virtual path 35 and virtual channel 38. Node 32 recognizes the VPI identifier "35" and the VCI identifier "38" as an incoming VPI/VCI pair.

Figure 3:
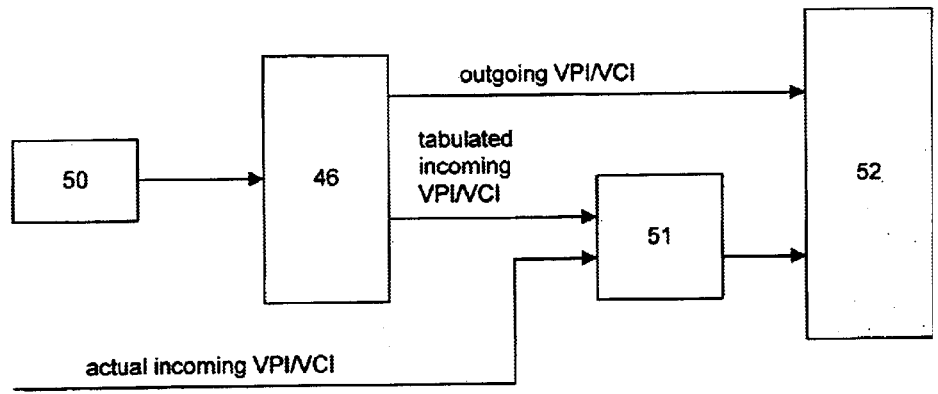
FIG. 3 is a pictorial representation of the prior art method of searching a VPI/VCI routing table.

In order for cell 10 to pass from node 32 to node 33, there must be a change in virtual path as well as a change in virtual channel. FIG. 2 shows the virtual path changes from 35 to 36, and the virtual channel changes from 38 to 40. Node 32 reads the incoming VPI/VCI, matches the incoming VPI/VCI with an outgoing VPI/VCI within node 32's memory, and swaps the incoming VPI/VCI in VPI memory location 14 and VCI memory location 15 with the matching VPI/VCI FIG. 3 shows a prior art method of reading an actual incoming VPI/VCI, matching the actual incoming VPI/VCI with a tabulated incoming VPI/VCI stored in node 32's memory, locating the outgoing VPI/VCI associated with the tabulated incoming VPI/VCI, and performing a number of functions related to the outgoing VPI/VCI, including, but not limited to, replacing the actual incoming VPI/VCI in VPI memory location 14 and VCI memory location 15 with the outgoing VPI/VCI. It should be understood that the prior art method described below is used as an example only and thus the exact method for reading, comparing, and swapping the VPI/VCI information is unimportant so long as the tabulated incoming VPI/VCIs and their associated outgoing VPI/VCI are stored in one table.

FIG. 3 shows table 46 which contains tabulated incoming VPI/VCIs along with their associated outgoing VPI/VCIs. Table 46 may be stored as a matrix having i number of cell compartments. To initiate the comparing and swapping steps, counter 50 first generates a number j, where j≦i. The number j is then used as a pointer which points to a cell compartment in table 46, where a tabulated incoming VPI/VCI is stored along with its associated outgoing VPI/VCI. The tabulated incoming VPI/VCI at location j is then compared with the actual incoming VPI/VCI at comparator 51. If the tabulated incoming VPI/VCI does not match the actual incoming VPI/VCI, then j is changed to another number, for example j+1, and a tabulated incoming VPI/VCI at location j+1 is compared with the actual incoming VPI/VCI. This step is repeated until the actual incoming VPI/VCI matches a tabulated incoming VPI/VCI. When the tabulated incoming VPI/VCI matches the actual incoming VPI/VCI, then the outgoing VPI/VCI information associated with the tabulated incoming VPI/VCI is passed to match decoder/selector 52. At match decoder/selector 52, the outgoing VPI/VCI information in cell j is swapped with (or another predetermined action is performed) the actual incoming information so that VPI location 14 and VCI location 15 of cell 10 now stores the outgoing VPI/VCI. Cell 10 is then sent to node 33 on the virtual path and virtual channel identified by the outgoing VPI and VCI.

Figure 4:
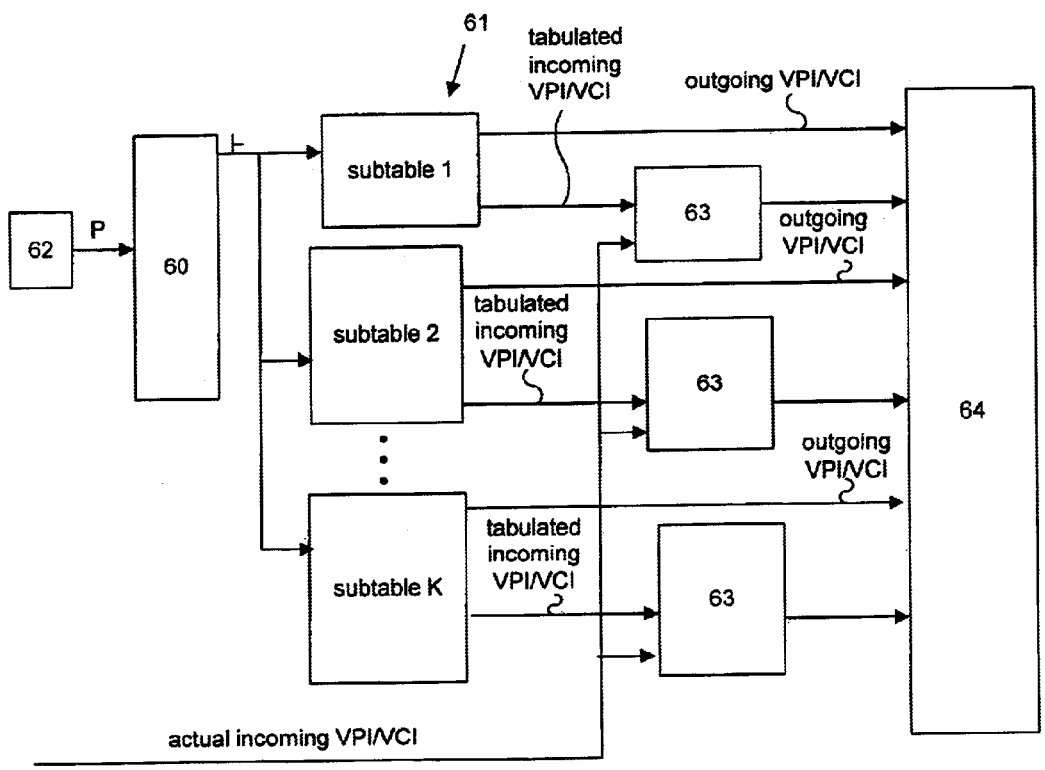
FIG. 4 is a pictorial representation of the present invention using parallel subtable searching techniques.

FIG. 4 is a pictorial representation of an embodiment of the present invention.

Generally, the present invention is a method of breaking down a large table 60 containing tabulated information into a plurality of subtables 61 having the same information and then searching through the plurality of subtables 61 to locate a specific piece of tabulated information. A detailed method for accomplishing the above method is disclosed below. It should be understood that the detailed method is disclosed as an example only and that various alternate methods can be used for reading a first piece of data, comparing this first piece of data with a second piece of data, and—if the first piece of data matches the second piece of data-performing a desired action, including, but not limited to, swapping, modifying, or removing the VPI/VCI information and/or swapping, modifying, or removing data sets associated with the VPI/VCI. For ease of description, the following detailed description will discuss swapping the VPI/VCI only. It should be readily apparent to those skilled in the art that the present method can easily be modified to perform other actions such as modifying or removing VPI/VCI information or data sets associated with the information.

As shown in FIG. 4, table 60 is a matrix having n number of cell compartments, with each cell compartment storing a tabulated incoming VPI/VCI and its associated outgoing VPI/VCI. Counter 62 generates a number P, where P≦n. P is used as a pointer pointing to each cell compartment in table 60. As P points from the first cell compartment in table 60 to the nth cell compartment in table 60, tabulated incoming VPI/VCI and its associated outgoing VPI/VCI are copied to subtables number 1 through K. Each subtable is a matrix containing m number of cells for storing tabulated incoming VPI/VCIs and their associated outgoing VPI/VCIs. The number of subtables, K, is found using the following equation:

$$K = \frac{n}{t}$$

where t is the time it takes for a node, for example node 32, to process cell 10. The number m is determined using the following equation:

$$x = \frac{n}{K},$$

where if the remainder of $$\frac{n}{K}$$

is 0, then m=x;
if the remainder of $$\frac{n}{K}$$

is not 0, then m is the next larger integer to x
Note if $$\frac{n}{K}$$

is a power of 2, for example $2^P$, and Q bits are necessary to address K subtables, then all subtables can be addressed as one table with P+Q address bits.

K does not have to be recalculated for every cell 10 that passes through node 32. As can be seen above, K is inversely related to t so that K increases when t decreases. Thus, the number of subtables should only be recalculated and a new set of subtables 61 built when the amount of data transfer per time unit increases above a preset criteria for a particular node.

Once subtables 61 have been built, a second pointer, r, is generated where r<m. Pointer r is used to simultaneously point to one cell compartment within each subtable 1 through K. The tabulated incoming VPI/VCIs stored within each cell compartment of subtables I through K are simultaneously compared with the actual incoming VPI/VCI at comparator 63. The algorithm used to compare the tabulated incoming VPI/VCIs with the actual incoming VPI/VCI can be any algorithm known in the art of numeric comparison algorithms. If none of the tabulated incoming VPI/VCIs stored in cell compartments r of subtables I through K matches the actual incoming VPI/VCI, then r is changed to, for example r+i, and the companion process is repeated. If, however, the tabulated incoming VPI/VCI in one of the cell compartments r of subtables I through K matches the actual incoming VPI/VCI, then the outgoing VPI/VCI associated with the matched tabulated incoming VPI/VCI is passed to match decoder/selector 64. At this point, counter 62 can, but needs not be, stopped. Match decoder/selector 64 replaces the actual incoming VPI/VCI stored in VPI location 14 and VCI location 15 with the outgoing VPI/VCI and/or takes other specific actions related to the incoming VPI/VCI, such as modifying or removing the incoming VPI/VCI. The algorithm used to swap the actual incoming VPI/VCI with the outgoing VPI/VCI may be any algorithm known in the art of number swapping algorithms.

After swapping the actual incoming VPI and VCI with the outgoing VPI/VCI, cell 10 is passed to node 33 on the virtual path and the virtual channel specified by the outgoing VPI and VCI.

There may be cases in which it is acceptable that the probability for finding a matching entry is below 100%. If so, then on a portion of each subtable—for example, 80% of each table—will be searched. If the actual incoming VPI/VCI cannot be matched with a tabulated incoming VPI/VCI located within, for example, the 80% of the subtables, various other methods for processing the cell known in the art can be used. For example, the actual VPI/VCI may be stored in computer memory and searched later in the 20% of each subtable not yet searched, when the amount of data transfer per frame unit decreases.

There may also be cases where cell processing time t changes but the number of subtables need not be recalculated. Sometimes, the cell processing time varies only by a small increment such as, for example, 2–3 time units. Rather than recalculating the subtables, the cell processing time t can be delayed (or additional delay removed) rather than having to recalculate the subtables. Note the method for splitting the table in subtables remains the same except t is selected so that either the subtables need not be recalculated or the splitting of the main table into subtables can be optimized.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

We claim:

1. A method for conveying a data packet from a first node to a second node comprising the steps of:
    reading a first VPI and a first VCI from said data packet at said first node;
    storing said first VPI and said first VCI in a computer memory location;
    simultaneously searching for a second VPI and a second VCI in parallel in a plurality of subtables, one subtable in said plurality of subtables containing said second VPI and said second VCI matching said first VPI and said first VCI;
    replacing said first VPI and said first VCI in said data packet with a third VPI and a third VCI, said third VPI and said third VCI associated with said second VPI and said second VCI; and
    conveying said data packet to said second node;
    wherein said plurality of subtables are constructed by dividing a first table, said first table containing said second VPI and said second VCI and said third VPI and said third VCI associated with said second VPI and said second VCI, and wherein the number of said plurality of subtables is determined by dividing a number of entries in said first table by a value representing the time it takes for said data packet to pass through said first node.

2. The method of claim 1, further comprising the steps of:
    storing said first VPI and said first VCI as a first VPI/VCI pair, storing said second VPI and said second VCI as a second VPI/VCI pair, and storing said third VPI and said third VCI as a third VPI/VCI.

3. The method of claim 1, wherein said first VPI and said first VCI are stored as a first VPI/VCI pair, said second VPI and said second VCI are stored as a second VPI/VCI pair, and said third VPI and said third VCI are stored as a third VPI/VCI pair.

4. An ATM network, comprising:
    a plurality of customer premise nodes,
    a plurality of network nodes;
    a plurality of physical links connecting said customer premise nodes to said network nodes; and
    at least one data packet transmitted through a plurality of physical links between said plurality of customer premise nodes and said plurality of network nodes, said data packet including a first VPI and a first VCI, said first VPI and said first VCI replaced by a second VPI and a second VCI when said data packet travels through a first network node in said plurality of network nodes, said second VPI and said second VCI determined by searching a plurality of subtables in parallel, with one subtable in said plurality of subtables containing a third VPI and a third VCI associated with said second VPI and said second VCI, said third VPI and said third VCI matching said first VPI and said first VCI;
    wherein said plurality of subtables are constructed by dividing up a first table containing a third VPI and a third VCI associated with said second VPI and said second VCI, said third VPI and said third VCI matching said first VPI and said first VCI, and wherein the number of said plurality of subtables is obtained by the number of entries in said first table divided by a value representing the time it takes said data packet to travel through said first network node in said plurality of network nodes.

5. The ATM network of claim 4, wherein said first VPI and said first VCI are stored as a first VPI/VCI pair, said second VPI and said second VCI are stored as a second VPI/VCI pair, and said third VPI and said third VCI are stored as a third VPI/VCI pair.

6. The ATM network of claim 4, wherein said first VPI and said first VCI are stored as a first VPI/VCI pair, said second VPI and said second VCI are stored as a second VPI/VCI pair, and said third VPI and said third VCI are stored as a third VPI/VCI pair.

* * * * *